(12) United States Patent
Mullin (10) Patent No.: US 9,781,551 B2
(45) Date of Patent: Oct. 3, 2017

(54) WIRELESS COMMUNICATIONS ADAPTER FOR A NETWORK DEVICE

(71) Applicant: Transition Networks, Inc., Minnetonka, MN (US)

(72) Inventor: Jeffrey Doyle Mullin, Elk River, MN (US)

(73) Assignee: Transition Networks, Inc., Minnetonka, MN (US)

( * ) Notice: Subject to any disclaimer, the term of this patent is extended or adjusted under 35 U.S.C. 154(b) by 0 days.

(21) Appl. No.: 15/264,061

(22) Filed: Sep. 13, 2016

(65) Prior Publication Data

US 2017/0094448 A1    Mar. 30, 2017

Related U.S. Application Data

(60) Provisional application No. 62/235,081, filed on Sep. 30, 2015.

(51) Int. Cl.
| | |
|---|---|
| H04W 4/00 | (2009.01) |
| G06F 1/32 | (2006.01) |
| G06F 13/42 | (2006.01) |
| H04W 76/02 | (2009.01) |
| G06F 13/40 | (2006.01) |
| G06F 3/03 | (2006.01) |
| H04W 88/06 | (2009.01) |

(52) U.S. Cl.
CPC .......... *H04W 4/008* (2013.01); *G06F 1/3287* (2013.01); *G06F 1/3296* (2013.01); *G06F 3/03* (2013.01); *G06F 13/4068* (2013.01); *G06F 13/4286* (2013.01); *H04W 76/023* (2013.01); *H04W 88/06* (2013.01)

(58) Field of Classification Search
CPC ............................ H04W 4/008; H04W 76/023
See application file for complete search history.

(56) References Cited

U.S. PATENT DOCUMENTS

2005/0119025 A1* 6/2005 Mohindra ............ H04B 1/0021
                                                            455/552.1

OTHER PUBLICATIONS

Dickson, "On-Chip High-Voltage Generation in MNOS Integrated Circuits Using an Improved Voltage Multiplier Technique," IEEE Journal of Solid-State Circuits, vol. SC-11, No. 3, Jun. 1976, pp. 374-378.

(Continued)

*Primary Examiner* — Tuan H Nguyen
(74) *Attorney, Agent, or Firm* — John D. Veldhuis-Kroeze; Westman, Champlin & Koehler, P.A.

(57) ABSTRACT

Described herein is an adapter that can facilitate communications between a bi-polar serial communications port of a network device and a mobile device that communicates wirelessly. The adapter can include circuitry configured to communicate and receive wireless signals to and from the mobile device over air at least at 1 Mbit/s. Such circuitry can also be configured to consume at most 0.5 W and convert a wireless signal into a unipolar signal, and vice versa. The adapter can also include an energy storage component configured to store energy from a bi-polar serial signal received from the port. The adapter can also include circuitry, configured to receive the stored electrical energy and convert a unipolar signal to a bi-polar serial signal compatible with the port using the received energy. The adapter can also include circuitry configured to convert a bipolar signal to a unipolar signal.

20 Claims, 7 Drawing Sheets

(56) References Cited

OTHER PUBLICATIONS

International Search Report and Written Opinion dated Oct. 28, 2016 for International Application No. PCT/US2016/051498 filed Sep. 13, 2016, 12 pages.
Texas Instruments, "CC2540 Bluetooth Low Energy USB Dangle," May 5, 2015, XP055311926, http://www.ti.com/lit/ug/tidu977/tidu977.pdf, 11 pages.
Duang-Dung Ho et al., "iVS: An Intelligent End-to-End Vital Sign Capture Platform Using Smartphones," 2014 IEEE 11th Consumer Communications and Networking Conference (CCNC), IEEE, Jan. 10, 2014, pp. 1-6, XP032780251.
Pushek Madaan, "Project #032: OOB Pairing," Cypress Semiconductor, Apr. 3, 2015, XP055312805, http://www.cypress.com/blog/100-project-days/project-032-oob-pairing.
Kevin Townsend et al., "Getting Started with Bluetooth Low Energy," May 12, 2014, O'Reilly Media, Inc., KP055206773, pp. 75-90.
Maxim Integrated Products, Inc., "USB-Powered Bipolar Supply," Aug. 18, 2009, pp. 1-2, XP055312796, http://www.maximintegrated.com/en/app-notes/index.mvp/id/4434.

\* cited by examiner

WIRELESS COMMUNICATIONS ADAPTER FOR A NETWORK DEVICE

CROSS REFERENCE TO RELATED APPLICATION

The present application is based on and claims the benefit of U.S. provisional patent application Ser. No. 62/235,081, filed Sep. 30, 2015, the content of which is hereby incorporated by reference in its entirety.

BACKGROUND OF THE INVENTION

This application relates to a wireless communications adapter for a network device. For example, this application relates to a BLUETOOTH LOW ENERGY (BLE) wireless communications adapter for a network device that does not have a BLE port.

Communications equipment of communications networks have been known to be managed and configured via terminal devices that can connect to the equipment via cables. Using cables to make such connections can raise many issues. For example, often the cable required is a unique adaptor cable, such as a cable specific to UNIVERSAL SERIAL BUS (USB) or RS232. Also, there are distance limitations associated with the length of a cable. Further, as mentioned below, it can be difficult to gain access to a management port of a network device to make wired connections.

The discussion above is merely provided for general background information and is not intended to be used as an aid in determining the scope of the claimed subject matter.

SUMMARY

The following summary is not intended to be limiting on the scope of what is claimed. This Summary is provided to introduce a selection of concepts in a simplified form that are further described below in the Detailed Description. This Summary is not intended to identify key features or essential features of the claimed subject matter.

Typically a cable connects the terminal device to network equipment through a USB interface or a RS232 port of the equipment. Also, often, terminal devices use command line user interfaces to interact with and configure network equipment. Because of small amounts of data typically communicated between devices associated with use of a command line user interface, wireless technologies could replace wired technologies such as RS232 and USB.

One of these wireless technologies that may be suited for communicating command line data between a mobile device and network equipment wirelessly is BLE. BLE may be useful because management ports usually send and receive small amounts of data at relatively low speeds. Also, command line data often merely includes text typed in from the command line terminal. BLE was designed for low bandwidth connectivity and it can be found in smartphones and tablets. Also, BLE radios when duty cycled can be made to run on just tens of microwatts of power. Both of these features make BLE a good candidate for communicating command line data wirelessly between a mobile device and a network device.

Disclosed herein is an example communications adapter (such as a BLE communications adapter) that can facilitate communications between a bi-polar serial communications port of a network device and a mobile device that communicates wirelessly. The adapter can include low-power wireless communications circuitry (e.g., low-power wireless communications circuitry 208 of FIG. 3), configured to communicate and receive wireless communications signals to and from a mobile device (e.g., mobile device 106 of FIGS. 1 and 3) over air at least at 1 megabit per second (Mbit/s). In some examples of the communications adapter, at least some of the wireless communication signals communicated and received by the low-power wireless communications circuitry conform to the aforementioned BLE standard of communicating over air at least at 1 Mbit/s and other BLE standards.

The low-power wireless communications circuitry can also be configured to consume at most 0.5 watts (W) of power (which is another BLE standard) and convert a wireless communications signal into a unipolar communications signal, and vice versa. Also, the low-power wireless communications circuitry may further include near field communication (NFC) circuitry configured to pair the wireless communications device with the communications adapter. The NFC circuitry may also be configured to hold the encryption key needed to encrypt and decrypt wireless communications signals communicated and received by the low-power wireless communications circuitry.

Figure 1:
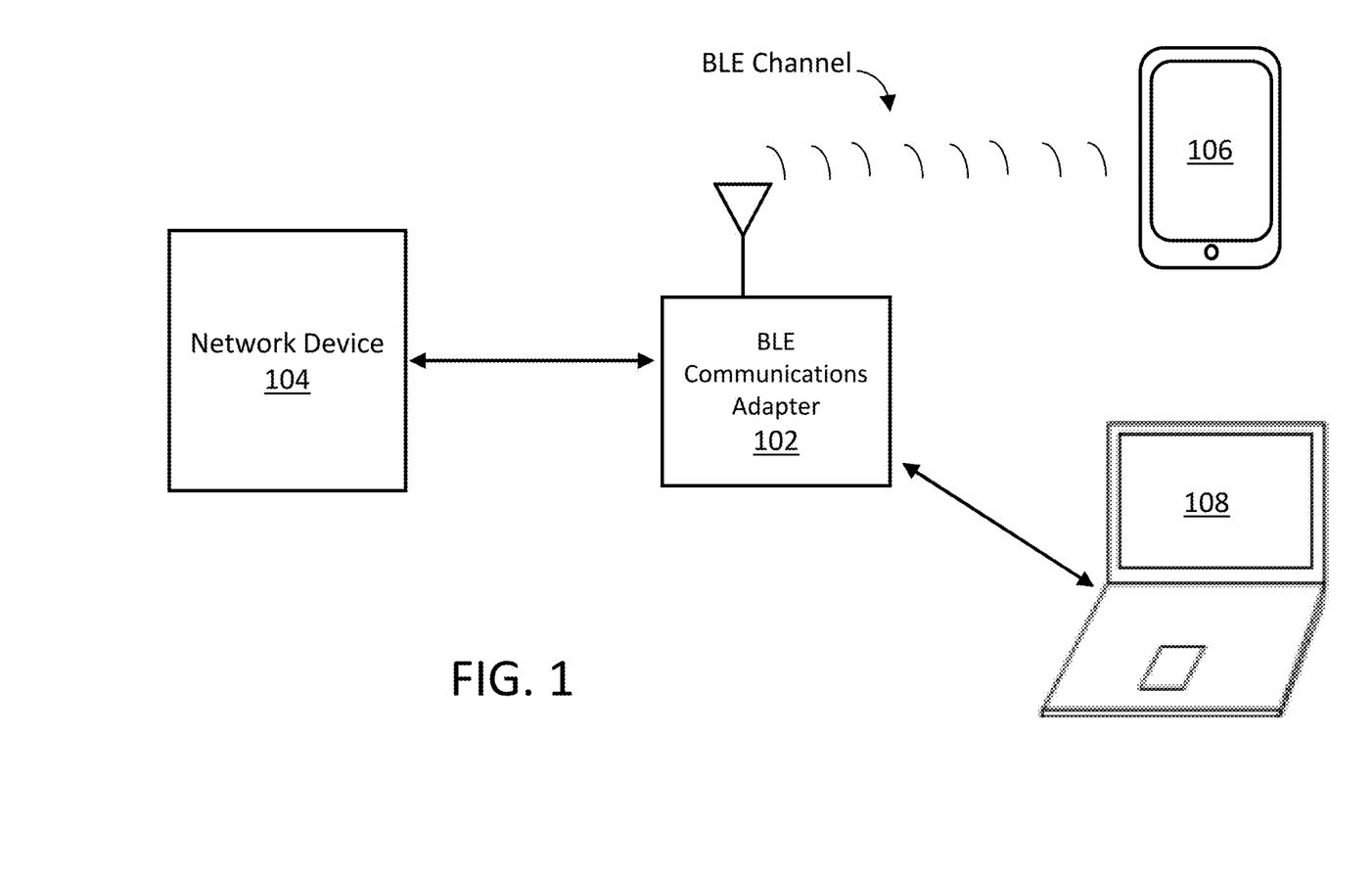
FIG. 1 illustrates a block diagram of an example network device that communicates with wireless and wired devices through an example BLUETOOTH LOW ENERGY (BLE) communications adapter.

The adapter can also include electrical energy storage circuitry (e.g., electrical energy storage circuitry 202 of FIG. 3), including an energy storage component (e.g., energy storage component 203 of FIG. 3) configured to store at least some electrical energy from a bi-polar serial communications signal received from a bi-polar serial communications port of a network device (e.g., network device 104 of FIG. 1). The electrical energy storage component may include a supercapacitor and/or a battery. Also, the electrical energy storage circuitry may include a photovoltaic system configured to supply electrical energy to the electrical energy storage component.

Figure 3:
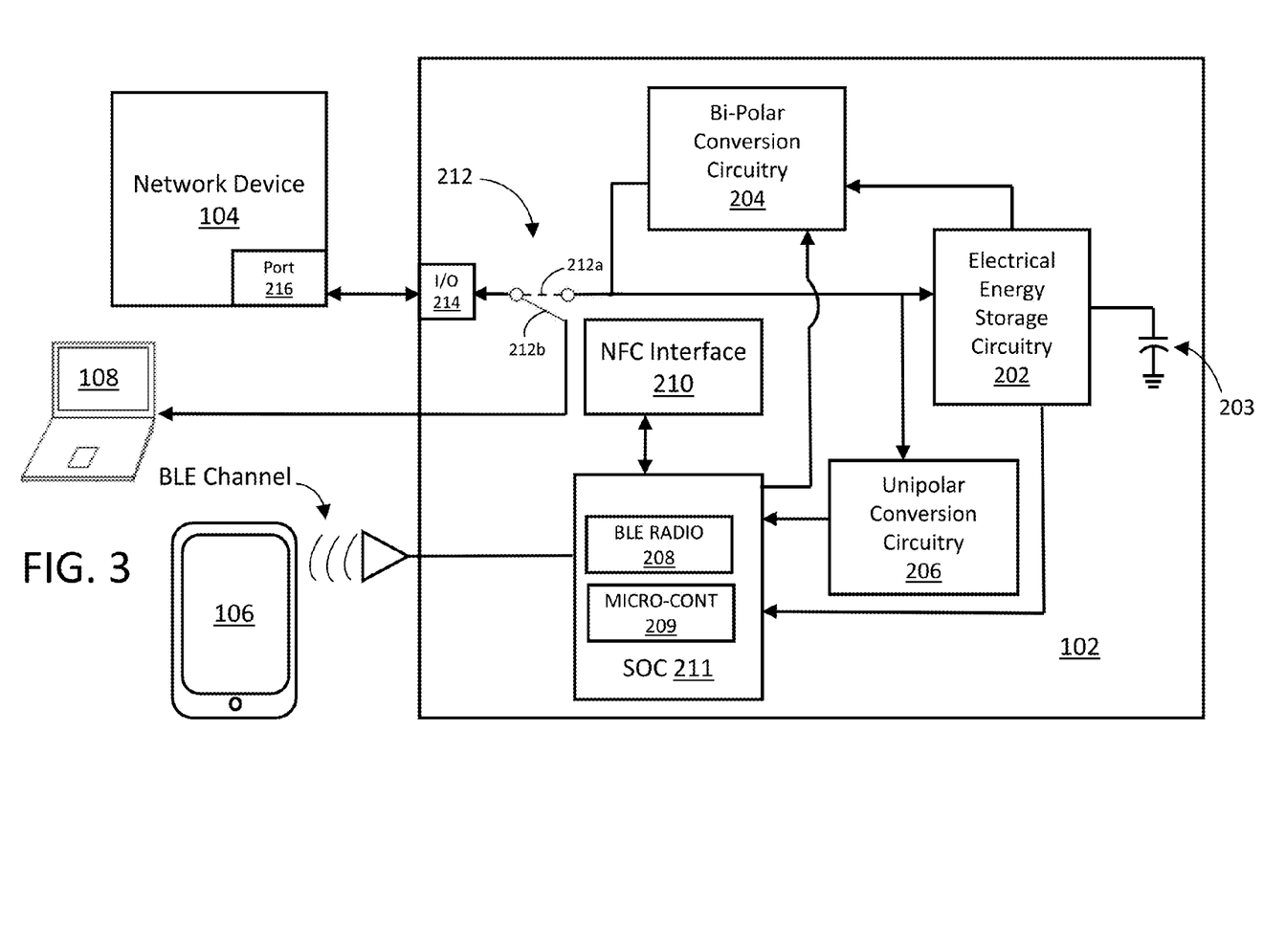
FIG. 3 illustrates a block diagram of an example BLE communications adapter, such as the adapter illustrated in FIG. 1.

The adapter can also include bi-polar conversion circuitry (e.g., bi-polar conversion circuitry 204), configured to receive electrical energy stored by the electrical energy storage component, and convert a unipolar communications signal, communicated by the low-power wireless communications circuitry, to a bi-polar serial communications signal compatible with the bi-polar serial communications port of the network device using the electrical energy received from the electrical energy storage component. The adapter can also include unipolar conversion circuitry (e.g., unipolar conversion circuitry 206), configured to convert a bipolar communications signal communicated from the bi-polar serial communications port of the network device, to a unipolar communications signal. The bi-polar serial communications signals may conform to RS-232 standards or USB standards. The unipolar signal may include a complementary metal-oxide semiconductor (CMOS) output signal.

A conversion by the signal conversion circuitry may use the electrical energy received from the electrical energy storage component to increase voltage of the unipolar communications signal. Also, the electrical energy storage circuitry may be configured to impedance match at least part of itself against the bi-polar serial communications port such that the impedance matching regulates storage of electrical energy from a bi-polar serial communications signal received from the bi-polar serial communications port.

The communications adapter may also include bypass circuitry, configured to provide a direct communicatively coupling between respective bi-polar serial communications ports of the network device and a terminal device, such that signals communicated to and from the terminal device bypass the unipolar conversion circuitry and the bi-polar conversion circuitry.

BRIEF DESCRIPTION OF THE DRAWINGS

The systems and methods may be better understood with reference to the following drawings and description. Non-limiting and non-exhaustive examples are described with reference to the following drawings. The components in the drawings are not necessarily to scale; emphasis instead is being placed upon illustrating the principles of the system. In the drawings, like referenced numerals designate corresponding parts throughout the different views.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," "coupled" and variations thereof are used broadly and encompass both direct and indirect connections and couplings. Further, "connected" and "coupled" are not restricted to physical or mechanical connections or couplings.

Aspects of systems and operations, described herein, labeled as "first", "second", and so on, should not necessarily be interpreted to have chronological associations with each other. In other words, such labels are used to merely distinguish aspects of the systems and operations described herein, unless the context of their use implies or expresses chronological associations.

FIG. 1 illustrates a block diagram of an example network device that communicates with wireless and wired devices through an example BLUETOOTH LOW ENERGY (BLE) communications adapter. As shown, BLE communications adapter 102 is communicatively coupled to network device 104 and mobile device 106 and terminal device 108. Each of the couplings of terminal device 108 and BLE communications adapter 102 to network device 104 include a wired connection. The coupling between mobile device 106 and BLE communications adapter 102 includes a wireless connection.

Network device 104 may include any known network equipment or computer networking devices. For example, network device 104 may include a gateway, which is a device placed at a network node and interfaces with another network that uses different protocols. Such a device may operate on Open Systems Interconnection model (OSI) layers 4 to 7.

Network device 104 may also include a router, which is a device that determines the next network point to which it can forward a data packet towards the ultimate destination of the packet. Unlike a gateway, it cannot interface different protocols. A router operates on OSI layer 3.

Also, network device 104 may include a switch, which is a device that allocates traffic from one network segment to certain lines (intended destination(s)) which connect the segment to another network segment. Unlike a hub, a switch splits the network traffic and sends it to different destinations rather than to all systems on the network. A switch works on OSI layer 2. Network device 104 may also include a Bridge, which is a device that connects multiple network segments along the data link layer. It also works on OSI layer 2.

Also, network device 104 may include a hub, which is a device that connects multiple Ethernet segments, making them act as a single segment. When using a hub, every attached device shares the same broadcast domain and the same collision domain. Therefore, only one computer connected to the hub is able to transmit at a time. Depending on the network topology, the hub provides a basic level 1 OSI model connection among the network objects (workstations, servers, etc.). It provides bandwidth which is shared among all the objects, in contrast to switches, which provide a connection between individual nodes. It works on OSI layer 1. Also, network device 104 may include a repeater, which is a device which amplifies or regenerates digital signals received while sending them from one part of a network into another. It works on OSI layer 1.

Other network devices may include a multiplexer (which is a device that combines several electrical signals into a single signal), a network interface controller (NIC) (which is a device connecting a computer to a wire-based computer network), and a wireless NIC (which is a device connecting the attached computer to a radio-based computer network). Network device 104 may also include a modem, which is a device that modulates an analog "carrier" signal (such as sound) to encode digital information, and that also demodulates such a carrier signal to decode the transmitted information. Used (for example) when a computer communicates with another computer over a telephone network. Network device 104 may also include ISDN terminal adapter (TA), which is a specialized gateway for ISDN. Network device 104 may also include line driver, which is a device to increase transmission distance by amplifying the signal; used in base-band networks only.

Mobile device 106 may include any type mobile device such as a smartphone or tablet, or wearable mobile device such as a smart watch. A mobile device may have an operating system (OS), and can run various types of application software, known as apps. Most mobile devices can also be equipped with Wi-Fi, Bluetooth, NFC and GPS capabilities that can allow connections to the Internet and other devices, such as an automobile or a microphone headset or can be used to provide Location-based services. A camera or media player feature for video or music files can also be typically found on these devices along with a stable battery power source such as a lithium battery. Increasingly mobile devices also contain sensors like accelerometers, compasses, magnetometers, or gyroscopes, allowing detection of orientation and motion. Also user input and output of mobile devices are often combined into a touch-screen interface.

Terminal device 108 may include any type of computerized device, such as a personal computer, having a wired communications port compatible for a wired connection with port 216 of network device 104. The terminal device 108 may include some mobile devices as well.

An advantage to utilizing BLE is that it can communicate over a greater distance than regular BLUETOOTH. Since command line interfaces usually communicate small amounts of data, the short packet communication feature of BLE is not a disadvantage with respect to regular BLUETOOTH. Another benefit of BLE is that legacy equipment may be adapted to wireless technologies using a BLE adapter. A disadvantage of a wired connection between a terminal management device and network equipment (such as a network device) that can be remedied by using wireless technologies (such as BLE) includes hazardous or extremely inconvenient locations of the network equipment. For example, the equipment may be very high off the ground or encased within a structure that may require some form of demolition to the structure to access the network device. Also, such structures, besides being inconvenient to take apart, may be hazardous due to plumbing containing harmful liquids or gasses. Wireless communications with such equipment would reduce such hazards and inconveniences.

Figure 2:
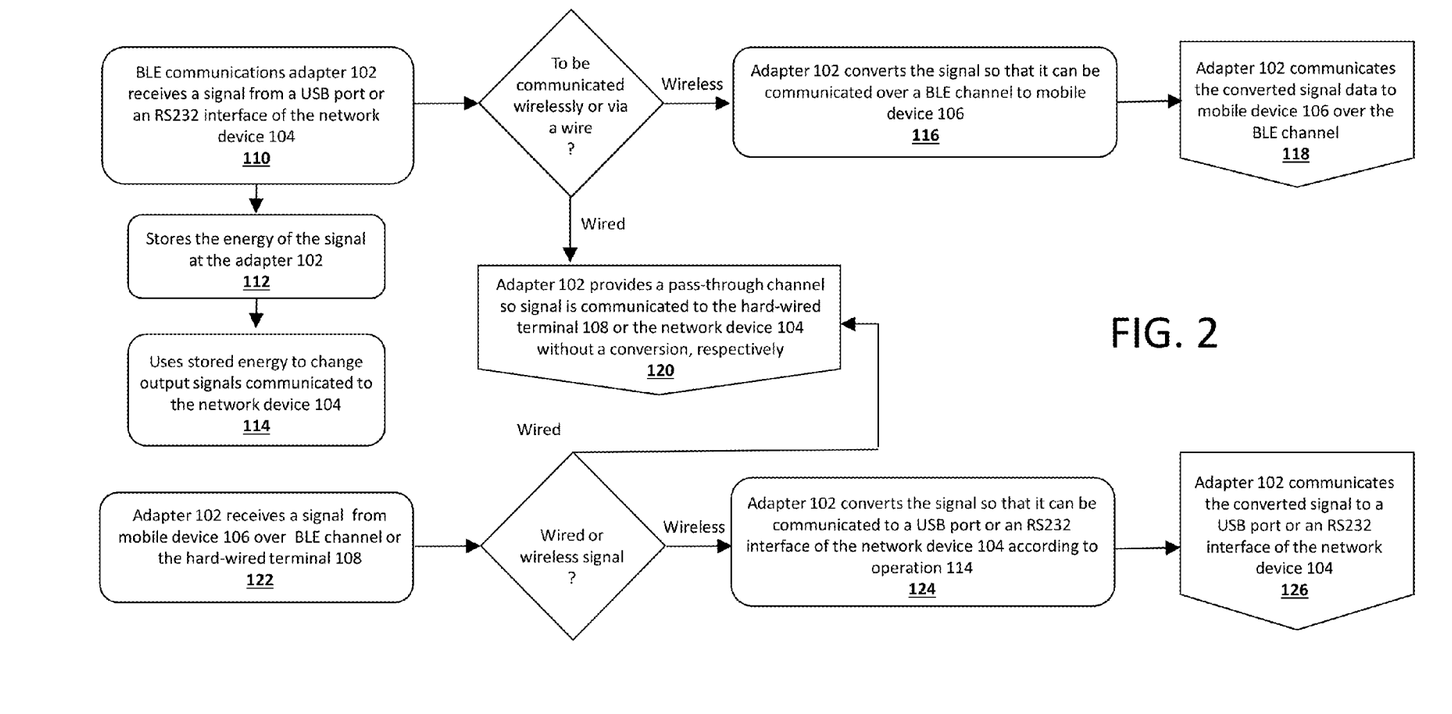
FIG. 2 illustrates a flow diagram of operations performed by an example BLE communications adapter, such as the adapter illustrated in FIG. 1.

FIG. 2 illustrates a flow diagram of operations performed by an example BLE communications adapter, such as BLE communications adapter 102 illustrated in FIG. 1. At 110, BLE communications adapter 102 receives a signal from a USB port or an RS232 interface of network device 104. At 112, an aspect of BLE communications adapter 102 (such as energy storage component 203) stores energy of the signal received from the USB port or the RS232 interface of network device 104. The stored energy may then be used to power aspects of the BLE communications adapter 102. Also, energy may be scavenged at transmit and receive pins of such ports at various states such as inactive or active marking states, or negative or positive voltage modes.

At 114, an aspect of BLE communications adapter 102 uses the stored energy to change output signals of the BLE communications adapter communicated back to network device 104. For example, unipolar serial data from the BLE communications adapter 102 will need to use the stored energy to convert the unipolar signal to a bipolar signal to communicate effectively to the RS232 interface of network device 104.

At 116, BLE communications adapter 102 converts the signal received from the USB port or the RS232 interface of network device 104, so that it can be communicated over a BLE channel to mobile device 106. This conversion occurs when it is determined (such as by the microcontroller 209 located inside of block 211 depicted in FIG. 3) that the signal received from the USB port or the RS232 interface is to be communicated from BLE communications adapter 102 wirelessly. For example, at 118, BLE communications adapter 102 communicates the converted signal data to mobile device 106 over the BLE channel. As depicted in FIG. 3, when bypass circuitry 212 is in a wireless communications state, such that the wireless communication can occur, communications through the switch occur along line 212a (depicted as a dashed-line in FIG. 3). At 118, BLE communications adapter 102 communicates the converted signal data to mobile device 106 over the BLE channel.

At 120, BLE communications adapter 102 provides a pass-through channel so the signal received from the USB port or the RS232 interface of network device 104 is communicated to terminal device 108 without a conversion. This pass-through occurs when it is determined (such as by microcontroller 209) that the signal received from the USB port or the RS232 interface is to be communicated from BLE communications adapter 102 via a wire. As depicted in FIG. 3, when bypass circuitry 212 is in a pass-through state, such that the pass-through communication via a wire occurs, communications through bypass circuitry 212 occur along line 212b (depicted as a solid-line in FIG. 3).

At 122, BLE communications adapter 102 receives a signal from mobile device 106 over the BLE channel or from terminal device 108. Upon receiving the received signal it is determined (such as by microcontroller 209 located in block 211 FIG. 3) if the signal was received by BLE communications adapter 102 via a wired or wireless interface. Where the signal was received via a wired interface, BLE communications adapter 102 provides the pass-through channel, at 120, so the signal received via the wired interface is communicated to network device without a conversion. This pass-through occurs when it is determined (such as by microcontroller 209 located in block 211 FIG. 3) that the signal was received by BLE communications adapter 102 from a wired line connected to terminal device 108. As depicted in FIG. 3, when bypass circuitry 212 is in a pass-through state, communications through bypass circuitry 212 occur along line 212b.

At 124, BLE communications adapter 102 has received a signal from mobile device 106 over the BLE channel. Upon receiving the received signal it is determined (such as by microcontroller 209 located in block 211 FIG. 3) that the signal was received by BLE communications adapter 102 via a wireless interface. Where the signal was received via a wireless interface, bypass circuitry 212 of BLE communications adapter 102 operates in a wireless communications state (as depicted by line 212a), such that at 124 the signal received via the wireless interface is communicated to network device with a conversion, such as the conversion at 114. As mentioned, at 114, an aspect of BLE communications adapter 102 uses stored energy to change output signals of the BLE communications adapter communicated back to network device 104 (such as converted signals compatible with USB or RS232). At 126, BLE communications adapter 102 communicates the converted signal to a USB port or an RS232 interface of network device 104.

FIG. 3 illustrates a block diagram of an example BLE communications adapter, such as the adapter illustrated in FIG. 1. As depicted, BLE communications adapter 102 includes electrical energy storage circuitry 202 (which includes energy storage component 203), bi-polar conversion circuitry 204, unipolar conversion circuitry 206, low-power wireless communications circuitry 208, near field communication (NFC) interface circuitry 210, and bypass circuitry 212. In one exemplary embodiment, low-power wireless communications circuitry 208 and a microcontroller 209 can be implemented in a system on a chip (SOC) 211. In yet other embodiments, still other components are integrated together into an ASIC or other integrated circuit or chip. As depicted, electrical energy storage circuitry 202 is directly communicatively coupled to bi-polar conversion circuitry 204 and unipolar conversion circuitry 206. Unipolar conversion circuitry 206 is directly communicatively coupled to low-power wireless communications circuitry 208. Low-power wireless communications circuitry 208 is directly communicatively coupled to NFC interface circuitry 210. Also, electrical energy storage circuitry 202, bi-polar conversion circuitry 204, and unipolar conversion circuitry 206 are directly communicatively coupled to bypass circuitry 212. Bypass circuitry 212 directly interfaces input/output circuitry 214 that is directly communicatively coupled to network device 104 via port 216.

BLE communications adapter 102 can facilitate communications between a bi-polar serial communications port (such as port 216) of a network device (such as network device 104) and a mobile device that communicates wirelessly (such as mobile device 106). BLE communications adapter 102 can include low-power wireless communications circuitry, such as low-power wireless communications circuitry 208, configured to communicate and receive wireless communications signals to and from a mobile device (such as mobile device 106) over air according to various wireless communications standards. For example, in some instances of BLE communications adapter 102, at least some of the wireless communication signals communicated and received by the low-power wireless communications circuitry 208 conform to BLE standards such that communications are over air are performed at least at 1 Mbit/s (which is a BLE standard). In the example depicted in FIG. 3, low-power wireless communications circuitry 208 can be configured to consume at most 0.5 W of power (which is another BLE standard) and convert a wireless communications signal into a unipolar communications signal, and vice versa.

In some examples, low-power wireless communications circuitry 208 and other circuitry described herein may be implemented by CMOS based technology. For example, low-power wireless communications circuitry 208 may include a CMOS microchip. In examples using CMOS technologies, such as the example using the CMOS microchip, the unipolar signals communicated and received by low-power wireless communications circuitry 208 are compatible with the CMOS chip.

Also, low-power wireless communications circuitry 208 may further include or be communicatively coupled directly (as depicted) to NFC interface circuitry 210 configured to pair mobile device 106 with BLE communications adapter 102. The NFC interface circuitry 210 may also be configured to encrypt and decrypt wireless communications signals communicated and received by low-power wireless communications circuitry 208. NFC circuitry 208 may also include circuitry that enables BLE communications adapter 102 and mobile device 106 to establish radio communication with each other by touching the devices together, or bringing them into proximity to a distance of 10 cm or less, for example.

Figure 5:
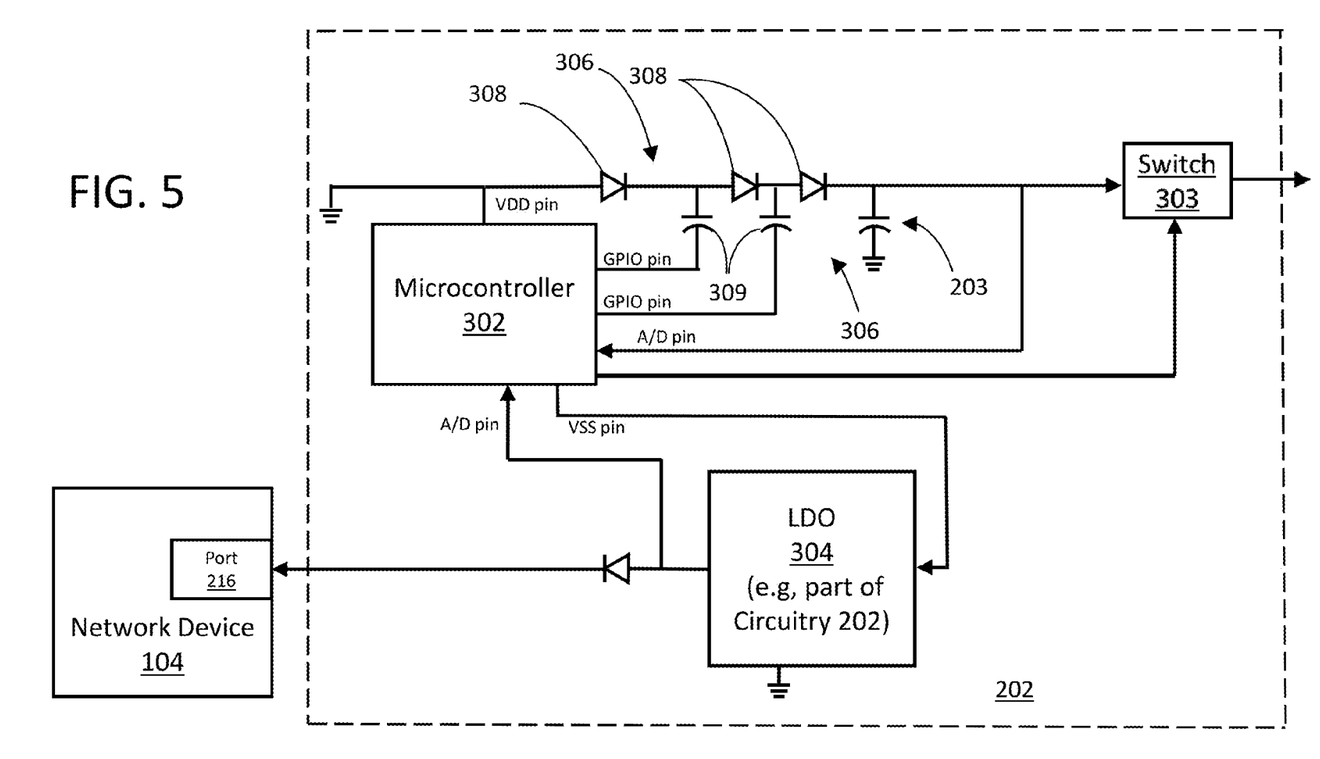
FIG. 5 illustrates a block diagram of example electrical energy storage circuitry of an example BLE communications adapter, such as the adapter illustrated in FIG. 3.

BLE communications adapter 102 also includes electrical energy storage circuitry 202. As specifically depicted in FIG. 3, electrical energy storage circuitry 202 is directly communicatively coupled to energy storage component 203. As depicted in FIG. 5, energy storage component 203 is a part of electrical energy storage circuitry 202. In both instances, storage component 203 is depicted as a capacitor. Energy storage component 203 can be configured to store at least some electrical energy from a bi-polar serial communications signal received from a bi-polar serial communications port, such as port 216, of network device 104. Energy storage component 203 may include a supercapacitor and/or a battery (not depicted). Also, electrical energy storage circuitry 202 may include a photovoltaic system configured to supply electrical energy to energy storage component 203 (not depicted). In an example, energy storage component 203 may have a 3.6 volt capacity and provide a 3.6 volt power supply to bi-polar conversion circuitry 204. In such an example and others, energy storage component 203 may provide a 3.3 volt power supply to low-power wireless communications circuitry 208.

BLE communications adapter 102 also includes bi-polar conversion circuitry 204. Bi-polar conversion circuitry 204 is configured to receive electrical energy stored by the energy storage component 203. Bi-polar conversion circuitry 204 is also configured to convert a unipolar communications signal, communicated by low-power wireless communications circuitry 208, to a bi-polar serial communications signal compatible with port 216 of network device 104 using the electrical energy received from the energy storage component 203. BLE communications adapter 102 also includes unipolar conversion circuitry 206. Unipolar conversion circuitry 206 is configured to convert a bipolar communications signal communicated from port 216 of network device 104, to a unipolar communications signal. The bi-polar serial communications signals may conform to RS-232 standards or UNIVERSAL SERIAL BUS (USB) standards. The unipolar signal may include a complementary metal-oxide semiconductor (CMOS) output signal.

A conversion by some of the signal conversion circuitry, such as bi-polar conversion circuitry 204 or conversion circuitry within low-power wireless communications circuitry 208, may use the electrical energy received from the energy storage component 203 to increase voltage of the communications signal in a signal conversion. For instance, in the conversion by bi-polar conversion circuitry 204 of the unipolar signal to the bi-polar signal, additional electrical energy is used to boost respective voltage of the signal. In the conversion by circuitry of low-power wireless communications circuitry 208, additional electrical energy is used to boost voltage of a received wireless signal such that it has compatible voltage levels of a unipolar signal receivable by bi-polar conversion circuitry 204.

Also, electrical energy storage circuitry 202 may be configured to impedance match at least part of itself against port 216 such that the impedance matching regulates storage of electrical energy from a bi-polar serial communications signal received from the bi-polar serial communications port. This functionality is described further with respect to FIGS. 5 and 6.

BLE communications adapter 102 also includes bypass circuitry 212 that is configured to provide a direct communicatively coupling between port 216 of network device 104 and terminal device 108 in a bypass state illustrated by line 212b. When in the bypass state, signals communicated to and from terminal device 108 bypass unipolar conversion circuitry 206 and bi-polar conversion circuitry 204, respectively. In a wireless communications state of bypass circuitry 212, illustrated by line 212a, signals communicated to and from mobile device 106 do pass through and are processed by unipolar conversion circuitry 206 and bi-polar conversion circuitry 204, respectively. Bypass circuitry 212 can include any type of switch or other electrical component which can break an electrical circuit, interrupting the current or diverting it from one conductor to another.

Port 216 may be any type of port used to interface terminals devices that manage network equipment. Port 216 may be a USB or an RS232 port, for example. Port 216 may include transmit and receive pins (not depicted). The energy harvested from signals communicated over port 216 may be signals communicated via the transmit and receive pins of port 216. Port 216 may communicate and receive signals of various voltage. For example, such signals may include ranges of plus or minus 5 to 15 volts. Load impedance of port 216 may vary as well. Typically, load impedance of port 216 is between 3 and 7 kilohms (KOhms). Given, these parameters approximately 8 milliwatts (mW) may be harvested from port 216 by electrical energy storage circuitry 202.

Figure 4:
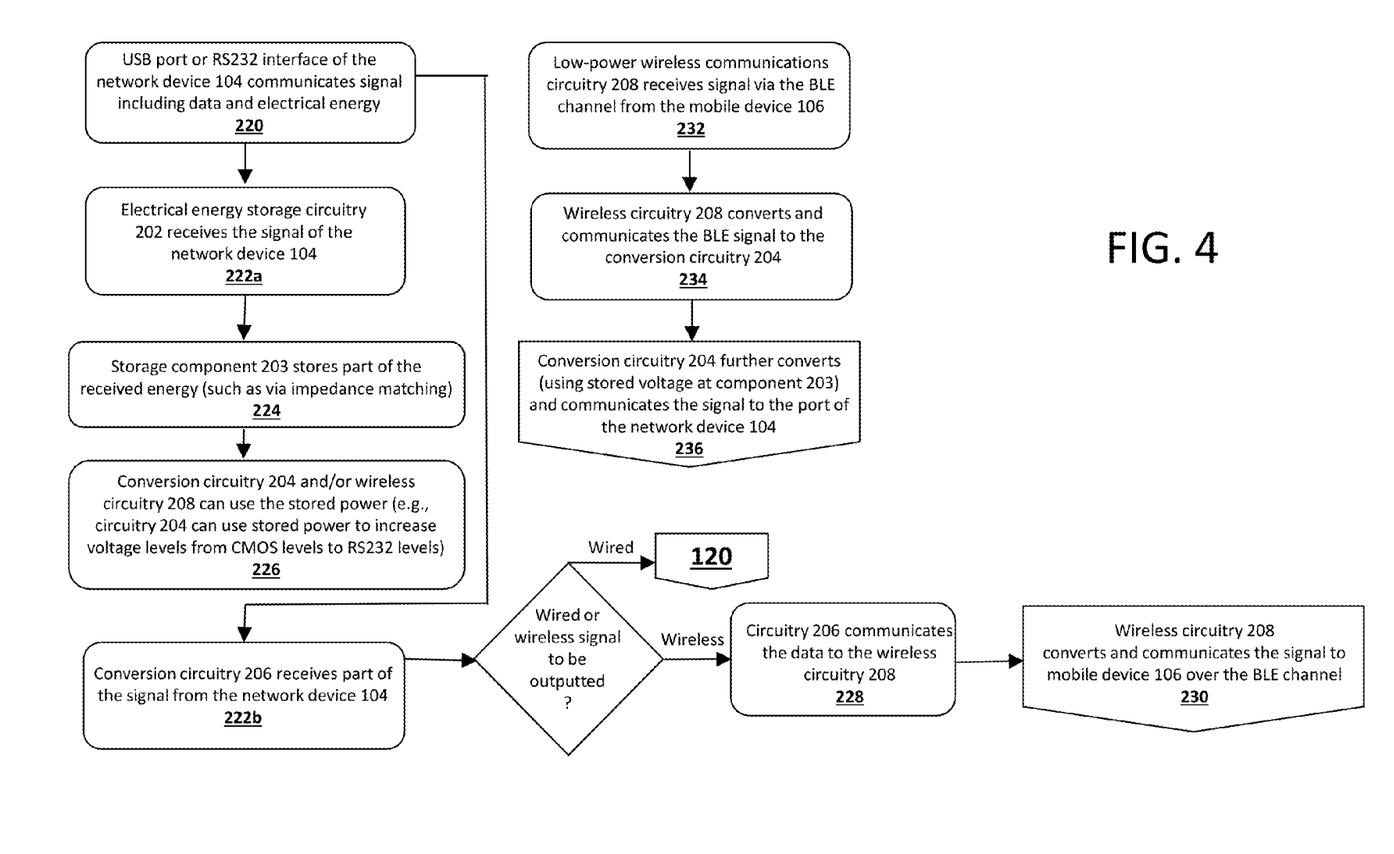
FIG. 4 illustrates a flow diagram of operations performed by an example BLE communications adapter, such as the adapter illustrated in FIG. 3.

FIG. 4 illustrates a flow diagram of operations performed by an example BLE communications adapter, such as the adapter illustrated in FIG. 3. At 220, a USB port or a RS232 interface port of network device 104 communicates a signal including data and electrical energy. Port 216 may include a USB port or a RS232 interface port, for example. At 222a, electrical energy storage circuitry 202 receives the signal communicated from network device 104. Also, at 222b, unipolar conversion circuitry 206 receives part of the electrical energy of the signal communicated from network device 104.

At 224, energy storage component 203 stores part of the received energy (such as via impedance matching). At 226, bipolar conversion circuitry 204 and/or circuitry of low-power wireless communications circuitry 208 can use the stored power stored in energy storage component 203. For instance, bipolar conversion circuitry 204 can use stored energy to increase voltage levels from CMOS levels to RS232 levels in the conversion of the unipolar signal to the bi-polar signal. Also, for example, conversion circuitry of low-power wireless communications circuitry 208 can use stored energy to increase voltage levels from received wireless levels to CMOS levels in the conversion of the received wireless signal to the unipolar signal compatible with bi-polar conversion circuitry 204.

As mentioned, at 222b, unipolar conversion circuitry 206 receives part of the electrical energy of the signal communicated from network device 104. Then it is determined whether a wired or wireless signal is to be outputted by BLE communications adapter 102. Where it is determined that the signal is to be communicated to a device that is communicatively coupled to BLE communications adapter 102 by a wire, the adapter provides a pass-through channel so the signal received from the USB port or the RS232 interface of network device 104 is communicated to terminal device 108 without a conversion, such as at 120 of FIG. 2. Where it is determined that the signal is to be communicated to a device that is communicatively coupled to BLE communications adapter 102 wirelessly, unipolar conversion circuitry 206 communicates the data of the signal to low-power wireless communications circuitry 208. At 230, low-power wireless communications circuitry 208 converts the signal to a BLE signal and communicates the signal to a mobile device, such as mobile device 106, over the BLE channel.

In the other direction, at 232, low-power wireless communications circuitry 208 receives a wireless signal, such as a BLE signal, via the BLE channel from mobile device 106. At 230, low-power wireless communications circuitry 208 converts the BLE signal to a unipolar signal (such as at CMOS voltage levels) and then communicates the converted BLE signal to the bi-polar conversion circuitry 204.

At 234, bi-polar conversion circuitry 204 further converts (using stored voltage of energy storage component 203) the unipolar signal to the bipolar signal. The bipolar signal including a higher level of voltage and is compatible with port 216 of network device 104. Bi-polar conversion circuitry 204 then communicates the signal to port 216 via bypass circuitry 212 (which would be in wireless communications state depicted by line 212a) and input/output circuitry 214, at 236. Input/output circuitry 214 input/output circuitry may include any type of circuitry that enables communication between BLE communications adapter 102 and port 216.

FIG. 5 illustrates a block diagram of example electrical energy storage circuitry of an example BLE communications adapter, such as the adapter illustrated in FIG. 3. As depicted, electrical energy storage circuitry 202, includes energy storage component 203, microcontroller 302, negative voltage low-dropout regulator (LDO) 304, and voltage doubler 306, which may include a Dickson charge pump. Also shown, network device 104 includes port 216.

Voltage doubler 306 may include analog-to-digital (A/D) voltage biasing resistors (not depicted), diodes 308, and capacitors 309. Voltage doubler 306 may isolate low impedance of depleted energy storage component 203 (which may be a supercapacitor in such an example) from impedance of port 216. In such an example and others, electrical energy store circuitry 202 may also include an A/D converter, and A/D voltage biasing resistors. Such a converter in the form of resistors, for example, may be connected along with diodes 308 depicted in FIG. 5. Such circuitry may be utilized when port 216 operates with a positive or negative polarity, depending on the implementation. If the pump is utilized in a positive polarity mode, then when port 216 operates in a negative polarity mode, energy from the corresponding signal may be harvested from the pump. This harvesting may be regulated according to LDO 304. The positive polarity state may represent "1" of digital logic, and the negative polarity state may represent "0" of digital logic, or vice versa depending on the implementation. The positive polarity state may range from 5 to 15 volts. The negative polarity state may range from −5 to −15 volts. In most examples, port 216 has an impedance of 3 to 7 kilohms (KOhms). In such examples, approximately 8 milliwatts (mW) of power can be harvested during a communication between network device 104 and BLE communications adapter 102. Such power can be stored as electrical or another form of energy by energy storage component 203.

As depicted in FIG. 5, microcontroller 302 includes several pins. Microcontroller 302 includes two general-purpose input/output (GPIO) pins communicatively coupled to capacitors 309 and two A/D pins communicatively coupled to an output end of energy storage component 203 and voltage doubler 306 and an output end of LDO 304, respectively. Microcontroller 302 also includes a negative voltage-supply pin ($V_{ss}$ pin) communicatively coupled to an input end of LDO 304 and a positive voltage-supply pin ($V_{DD}$ pin) communicatively coupled to an input end of voltage doubler 306. Microcontroller 302 can measure voltage at the input of LDO 304 via the $V_{ss}$ pin. Then microcontroller 302 can modulate its GPIO pins with opposite phase to consequently affect capacitors 309 to enable voltage doubler 306.

As depicted, voltage doubler may be a voltage inverting and doubling Dickson charge pump. Given this arrangement, the microcontroller can adjust switching frequency and duty cycle to affect an impedance of voltage doubler 306 until it matches an impedance of port 216 of network device 104. Impedance is matched when voltage at the input of LDO 304 is maintained at half of its initial open circuit voltage. In such an example, voltage doubler 306 can be disabled when a voltage of an energy storage device, such as a supercapacitor, storing charge is charged to 3.6 volts.

Figure 6:
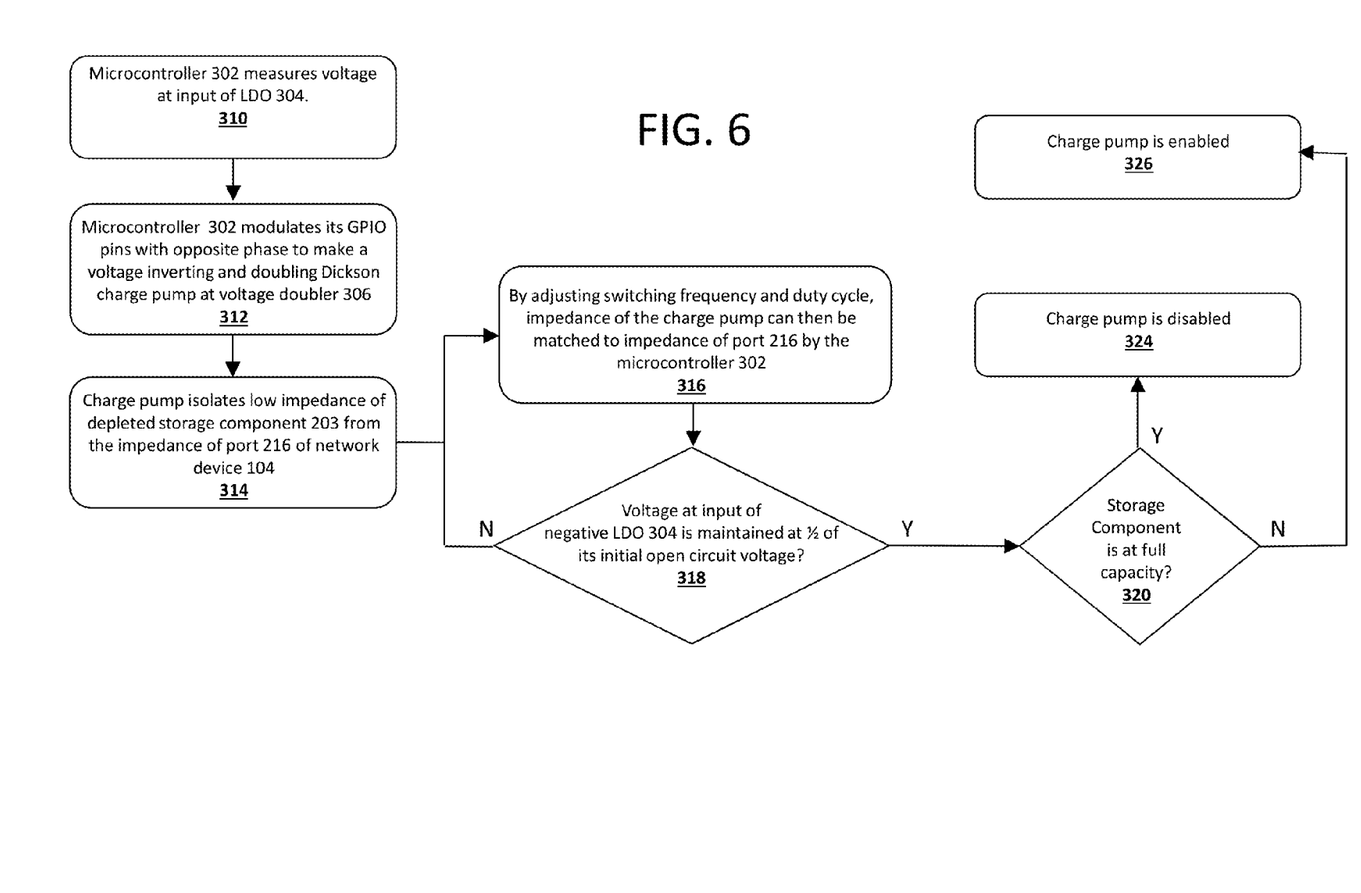
FIG. 6 illustrates a flow diagram of operations performed by example electrical energy storage circuitry, such as the electrical energy storage circuitry illustrated in FIG. 5.

FIG. 6 illustrates a flow diagram of operations performed by example electrical energy storage circuitry, such as the electrical energy storage circuitry illustrated in FIG. 5. At 310, microcontroller 302 measures voltage at input of LDO 304. At 312, microcontroller 302 modulates its GPIO pins with opposite phase to make a voltage inverting and doubling Dickson charge pump of voltage doubler 306. At 314, the charge pump isolates low impedance of depleted energy storage component 203 from the impedance of port 216 of network device 104. At 316, by adjusting switching frequency and duty cycle at microcontroller 302, impedance of the charge pump can then be matched to impedance of port 216. At 318, it is determined by the microcontroller if voltage at the input of LDO 304 is maintained at half of its initial open circuit voltage. If the voltage is not maintained at half of the initial open circuit voltage, the microcontroller continues the adjustments at 316. If the voltage is maintained at half of the initial open circuit voltage, it is determined by the controller whether energy storage component 203 is at full capacity at 320. If energy storage component 203 is at full capacity, then microcontroller 302 disables the pump at 324; otherwise, the pump is enabled at 326 by the microcontroller.

In some exemplary embodiments, a switch 303 is connected, as a supply voltage output control device, to energy storage component 203. From an initializing time, microcontroller 302 can control switch 303 from supplying power to other components until the desired supply voltage is achieved. At that point, microcontroller 302 can connect the energy storage component to the components to be powered.

Figure 7:
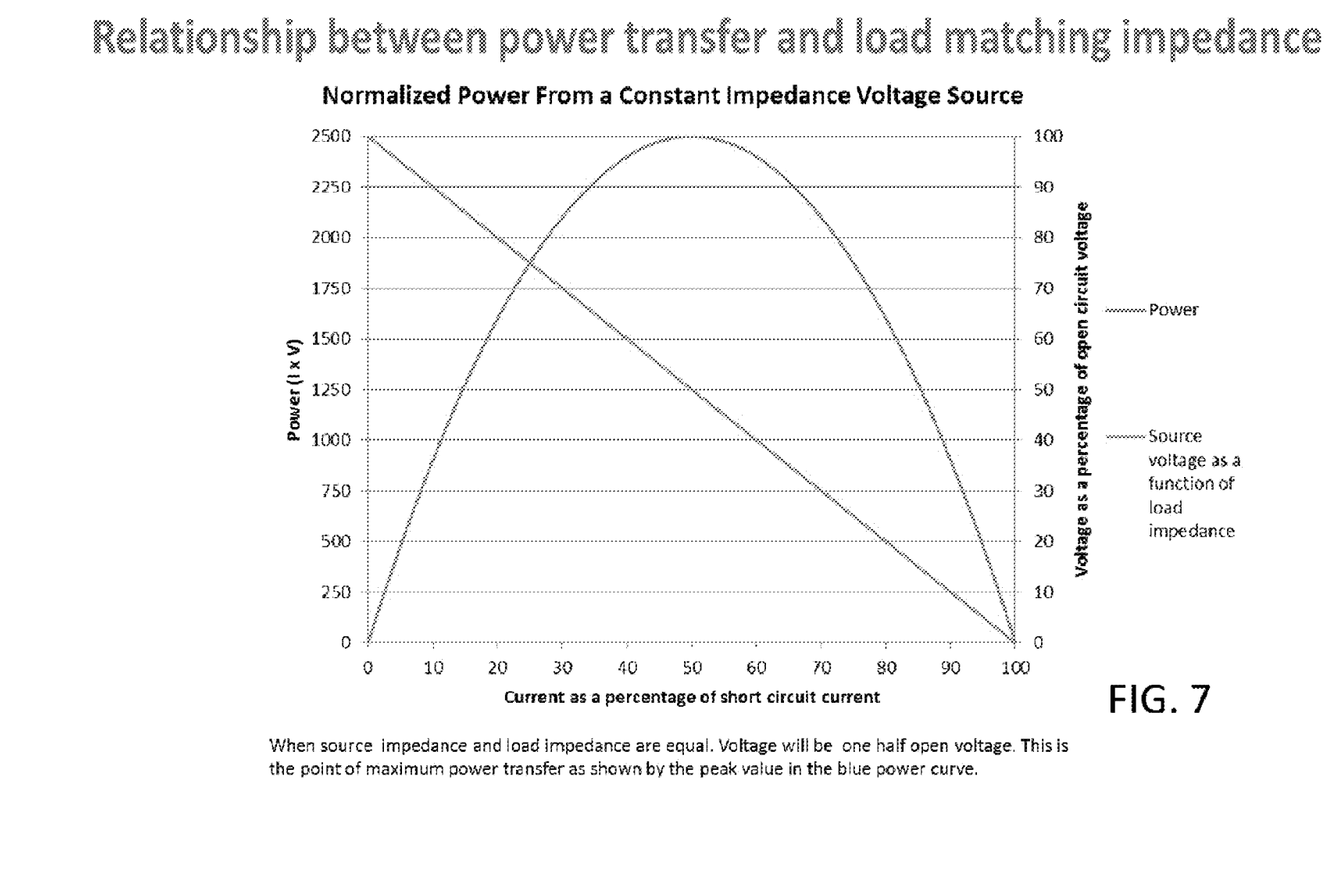
FIG. 7 is a plot showing the relationship between impedance matching and power transfer.

FIG. 7 is a plot showing the relationship between impedance matching and power transfer.

Although the present invention has been described with reference to preferred embodiments, workers skilled in the art will recognize that changes may be made in form and detail without departing from the spirit and scope of the invention.

What is claimed is:

1. A communications adapter, comprising:
   low-power wireless communications circuitry, configured to:
      communicate and receive wireless communications signals to and from a mobile device over air at least at 1 megabit per second;
      consume at most 0.5 watts of power; and
      convert a wireless communications signal into a unipolar communications signal, and vice versa;
   electrical energy storage circuitry, including an electrical energy storage component configured to store at least some electrical energy from a bi-polar serial communications signal received from a bi-polar serial communications port of a network device;
   bi-polar conversion circuitry, configured to:
      receive electrical energy stored by the electrical energy storage component; and
      convert a unipolar communications signal, communicated by the low-power wireless communications circuitry, to a bi-polar serial communications signal compatible with the bi-polar serial communications port of the network device using the electrical energy received from the electrical energy storage component; and
   unipolar conversion circuitry configured to convert a bipolar communications signal, communicated from the bi-polar serial communications port of the network device, to a unipolar communications signal.

2. The communications adapter of claim 1, wherein at least some of the wireless communication signals communicated and received by the low-power wireless communications circuitry conform to BLUETOOTH LOW ENERGY standards.

3. The communications adapter of claim 1, wherein the bi-polar serial communications signals conform to RS-232 standards.

4. The communications adapter of claim 1, wherein the bi-polar serial communications signals conform to UNIVERSAL SERIAL BUS standards.

5. The communications adapter of claim 1, wherein the electrical energy storage component includes a supercapacitor.

6. The communications adapter of claim 1, wherein the electrical energy storage component includes a battery.

7. The communications adapter of claim 1, wherein the electrical energy storage circuitry includes a photovoltaic system configured to supply electrical energy to the electrical energy storage component.

8. The communications adapter of claim 1, wherein a signal conversion by the bi-polar conversion circuitry uses the electrical energy received from the electrical energy storage component to increase voltage of a unipolar communications signal such that it becomes a bi-polar serial communications signal.

9. The communications adapter of claim 1, wherein electrical energy storage circuitry is configured to impedance match at least part of itself against the bi-polar serial communications port such that the impedance matching regulates storage of electrical energy from a bi-polar serial communications signal received from the bi-polar serial communications port.

10. The communications adapter of claim 1, wherein a unipolar signal communicated from the low-power wireless communications circuitry includes a complementary metal-oxide semiconductor (CMOS) signal.

11. The communications adapter of claim 1, further comprising bypass circuitry configured to provide a direct communicative coupling between respective bi-polar serial communications ports of the network device and a terminal device, such that signals communicated to and from the terminal device bypass the unipolar conversion circuitry and the bi-polar conversion circuitry.

12. The communications adapter of claim 1, wherein the low-power wireless communications circuitry further comprises near field communication (NFC) circuitry configured to:
   pair the mobile device with the communications adapter; and
   encrypt and decrypt wireless communications signals communicated and received by the low-power wireless communications circuitry.

13. A method implemented by a communications adapter, comprising:
   low-power wireless communications circuitry:
      consuming at most 0.5 watts of power;
      receiving a wireless communications signal from a mobile device over air at least at 1 megabit per second; and
      converting the wireless communications signal into a unipolar communications signal; and
   bi-polar conversion circuitry:
      converting the unipolar communications signal to a bi-polar serial communications signal compatible with a bi-polar serial communications port of a network device, the conversion using electrical energy stored by an electrical energy storage component of the adapter to increase voltage of the unipolar communications signal; and communicating the bi-polar serial communications signal to the bi-polar serial communications port of the network device.

14. The method of claim 13, wherein the wireless communication signal includes a BLUETOOTH LOW ENERGY signal, wherein the bi-polar serial communications signal includes an RS-232 signal, and wherein the bi-polar serial communications port includes an RS-232 port.

15. The method of claim 13, further comprising:
receiving a bi-polar serial communications signal from the bi-polar serial communications port of the network device; and
storing, at the electrical energy storage component, at least some electrical energy from the bi-polar serial communications signal received from the bi-polar serial communications port.

16. The method of claim 15, further comprising impedance matching at least a part of the adapter against the bi-polar serial communications port such that the impedance matching regulates storage of electrical energy from the bi-polar serial communications signal received from the bi-polar serial communications port.

17. The method of claim 13, wherein the electrical energy storage component includes a supercapacitor, a battery, or a photovoltaic system.

18. The method of claim 13, further comprising:
pairing the mobile device with the communications adapter; and
decrypting the wireless communications signal.

19. A communications adapter, comprising:
low-power wireless communications circuitry, configured to:
communicate and receive wireless communications signals to and from a mobile device over air at least at 1 megabit per second, wherein at least some of the wireless communication signals communicated and received by the low-power wireless communications circuitry conform to BLUETOOTH LOW ENERGY standards;
consume at most 0.5 watts of power; and
convert a wireless communications signal into a unipolar communications signal, and vice versa;
electrical energy storage circuitry, including an electrical energy storage component configured to store at least some electrical energy from a bi-polar serial communications signal received from a bi-polar serial communications port of a network device, wherein bi-polar serial communications signals communicated and received by the bi-polar serial communications port conform to RS-232 standards;
bi-polar conversion circuitry, configured to:
receive electrical energy stored by the electrical energy storage component; and
convert a unipolar communications signal, communicated by the low-power wireless communications circuitry, to a bi-polar serial communications signal compatible with the bi-polar serial communications port of the network device using the electrical energy received from the electrical energy storage component; and
unipolar conversion circuitry configured to convert a bipolar communications signal, communicated from the bi-polar serial communications port of the network device, to a unipolar communications signal.

20. The communications adapter of claim 19, wherein the electrical energy storage component includes a supercapacitor, a battery, or a photovoltaic system.

* * * * *

UNITED STATES PATENT AND TRADEMARK OFFICE
CERTIFICATE OF CORRECTION

PATENT NO. : 9,781,551 B2
APPLICATION NO. : 15/264061
DATED : October 3, 2017
INVENTOR(S) : Jeffrey Doyle Mullin Page 1 of 1

It is certified that error appears in the above-identified patent and that said Letters Patent is hereby corrected as shown below:

On the Title Page

In the References Cited:

Please delete "Texas Instruments, "CC2540 Bluetooth Low Energy USB Dangle," May 5, 2015. XP055311926, http://www.ti.com/lit/ug/tidu977/tidu977.pdf, 11 pages." and insert --Texas Instruments, "CC2540 Bluetooth Low Energy USB Dongle," May 5, 2015. XP055311926, http://www.ti.com/lit/ug/tidu977/tidu977.pdf, 11 pages.--

Please delete "Duang-Dung Ho et al., "iVS: An Intelligent End-to-End Vital Sign Capture Platform Using Smartphones," 2014 IEEE 11th Consumer Communications and Networking Conference (CCNC), IEEE, Jan. 10, 2014, pp. 1-6, XP032780251." and insert --Quang-Dung Ho et al., "iVS: An Intelligent End-to-End Vital Sign Capture Platform Using Smartphones," 2014 IEEE 11th Consumer Communications and Networking Conference (CCNC), IEEE, Jan. 10, 2014, pp. 1-6, XP032780251.--

Signed and Sealed this
Seventeenth Day of April, 2018

Andrei Iancu
*Director of the United States Patent and Trademark Office*